July 6, 1937.  C. J. HOLSLAG  2,086,316

REACTOR

Filed Jan. 15, 1936

INVENTOR
Claude J. Holslag
BY
A. D. T. Libby
ATTORNEY

Patented July 6, 1937

2,086,316

UNITED STATES PATENT OFFICE 2,086,316

REACTOR

Claude J. Holslag, South Orange, N. J., assignor to Electric Arc Cutting & Welding Company, Newark, N. J.

Application January 15, 1936, Serial No. 59,191

7 Claims. (Cl. 171—242)

This invention relates to a reactor, especially adapted for use in electric welding circuits, particularly those using alternating current as the source of power.

In an arc welding circuit using alternating current, considerable reactance is necessary for satisfactory welding. This reactance may be obtained in several ways. Likewise, the reactance may be varied in different ways. One of the ways for obtaining the necessary reactance and for varying it is disclosed in my Reissue Patent 16,012, issued March 3, 1925. A further way is disclosed in my Patent 1,305,363, issued June 3, 1919, in which arrangements it will be seen that the inherent reactance in the transformer is varied by taps on the windings and by a moving part of the core located to carry a certain amount of the flux generated by one or more of the windings.

Since the time when the inventions of these patents were made by me, the trend in electric arc welding has been toward the use of a larger current in the welding circuit; for example, where, at the time said applications were filed, two hundred amperes were considered satisfactory for a certain class of welding, the requirements for similar work at the present time call for a value of current up to four hundred amperes. With this larger current, I have found it difficult and well-nigh impractical to move a core portion when disposed in the manner indicated in my patents previously referred to, because of the heavy magnetic drag on such moving part and the tendency to vibrate or chatter, causing noise and wear, leading to inoperativeness. The same applies to any arrangement where a coil is moved to change the impedance or a combination of movable core and coils.

My present invention is therefore directed to an improved form of reactor separate and distinct from the main welding machine.

My invention will be best understood by reference to the annexed drawing wherein.

Figure 1:
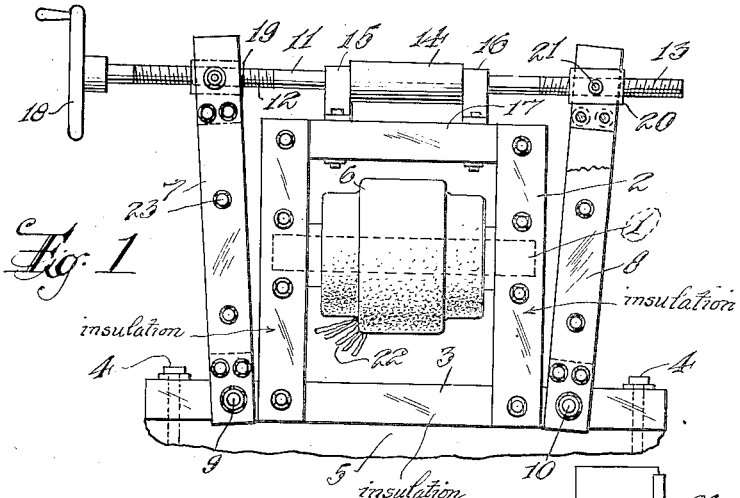
Figure 1 is a side elevation illustrating a form of reactor which I have found very satisfactory for the purpose.

Referring to Figure 1, a core 1 of magnetic material is carried in a rectangularly shaped frame 2 constructed of non-magnetic material, either of insulation or metal, or a combination of both. The frame includes a base member 3 which is preferably extended at both ends to receive a plurality of fastening-down bolts 4 adapted to engage a support member 5. The core 1 carries a winding 6 having a plurality of taps 22 extending therefrom preferably to sockets in a plug board. Positioned adjacent the opposite ends of the core 1, are members 7 and 8 of suitable magnetic material preferably built up of suitable laminations of the required size and held together by bolts or studs 23, to cooperate with the core 1 and the winding 6. The members 7 and 8 are pivotally mounted at 9 and 10 respectively to the base member 3.

Through the free ends of the members 7 and 8, passes a rod 11 threaded at 12 and 13, with reverse threads. The rod 11 is carried by a support 14 carried by brackets 15 and 16 attached to the top frame member 17. The rod 11 is provided with a handwheel 18 for turning it. The members 7 and 8 are preferably provided with suitable bushings 19 and 20 to receive the threaded portions 12 and 13 of the rod 11. The bushings 19 and 20 are also preferably mounted on studs 21 carried by the members 7 and 8 in such a manner that the members 7 and 8 will readily follow the movement impressed thereon by the rod 11.

As will be seen from Figure 1, it will be noted that the reactor has an open magnetic circuit core and the members 7 and 8 are disposed a substantial distance away from the opposite ends of the core 1 with which they can never come in contact, as the ends of the core preferably do not project through the end members 2 of the frame carrying the core and winding.

Figure 2:
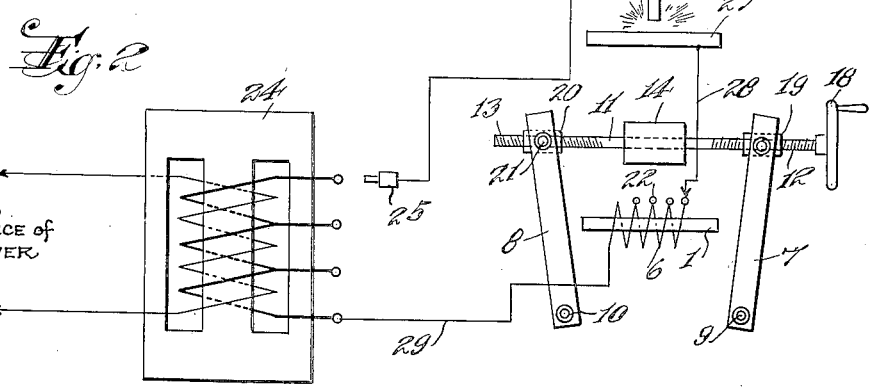
Figure 2 is a diagrammatic illustration showing one application of the reactor of Figure 1.

In Figure 2 I have shown a transformer 24 of the shell type having a plurality of taps on the secondary adapted to be connected by the plug 25 to an electrode 26 in an arc welding circuit including, as the opposite electrode, a workpiece 27 which is connected by a conductor 28 to any one of the desired taps 22 on the winding 6 of the reactor, the opposite ends of the winding 6 being connected by the conductor 29 to one terminal of the secondary of the transformer 24. In this arrangement, substantially all of the reactance is embodied in the reactor itself.

Figure 3:
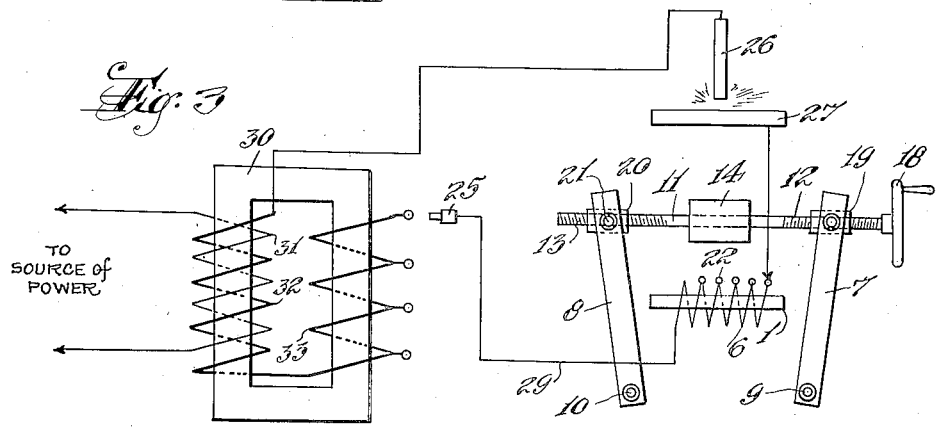
Figure 3 is a further diagrammatic illustration of an arc welding circuit using my reactor therein.

In Figure 3 the transformer 30 is of the core type having a primary 31, a main secondary 32, and an auxiliary secondary 33, this transformer having considerable inherent reactance, the balance, required for suitable welding, being in the reactor. With the type of reactor shown, I can get approximately 20% of the necessary current variation by varying the location of the exposed magnetic material comprising the members 7 and 8. By having a few taps on the reactor and taps on the transformer, the arrangement will give smooth gradations of current, which is impossible with use of taps only, no matter how frequent the taps are within, of course, a practical range.

While I have shown two movable reactor members 7 and 8, there are certain conditions where only one may be required. Furtherfore, while I have shown the reactor in use in an arc welding circuit, it may be found useful in other systems; for example, in the spot, butt, or seam welding systems.

What I claim is:

1. A reactor having an open magnetic circuit comprising only a centrally located core of magnetic material, a winding on said core, members of magnetic material movably disposed at each end of the core but having no contact therewith, said members having no substantial magnetic return circuit therebetween and means for simultaneously adjusting said members with respect to the core.

2. A reactor having a rectangularly shaped frame of non-magnetic material, a core of magnetic material located in the frame, a pair of members of magnetic material pivotally mounted on said frame, one at each end of the core but spaced apart therefrom, and means for simultaneously adjusting said members toward and from the core.

3. A reactor as set forth in claim 2, further characterized in that the winding has taps and the adjusting means includes a screw-threaded rod carried on the frame and passing through said members and having means for turning the rod.

4. A reactor as set forth in claim 2, further characterized in that said adjusting means includes movable bushings in the free ends of said pivoted members, and a rod centrally supported on the frame and having threaded portions located in said bushings, means for turning the rod and taps extending from said winding.

5. A reactor as set forth in claim 2, further characterized in that the bottom frame member has extensions at opposite ends for mounting the reactor, the said pivoted members being pivoted to said bottom frame member, said adjusting means including a support device on a top frame member with an adjusting rod supported by said device and having portions threaded in opposite directions engaging parts of said pivoted members, with means for turning said rod.

6. A reactor having an open circuit core of magnetic material, a winding on said core, a frame carrying the core and winding, at least one member of magnetic material spaced apart from the end of the core and substantially at right angles thereto and extending a substantial distance at both ends beyond the core, one end being pivoted on the frame, while the other end is provided with adjusting means to move its central part toward and away from the end of the core.

7. A reactor as set forth in claim 6, further characterized in that said adjusting means includes a rod having right and left-hand threads engaging parts of said members of magnetic material, with means for turning the rod, said winding being provided with taps for the purpose described.

CLAUDE J. HOLSLAG.